Jan. 11, 1944. G. L. POWNALL 2,339,109
ICE REFRIGERATION AND CUBE FORMING
Filed March 28, 1940 7 Sheets-Sheet 2
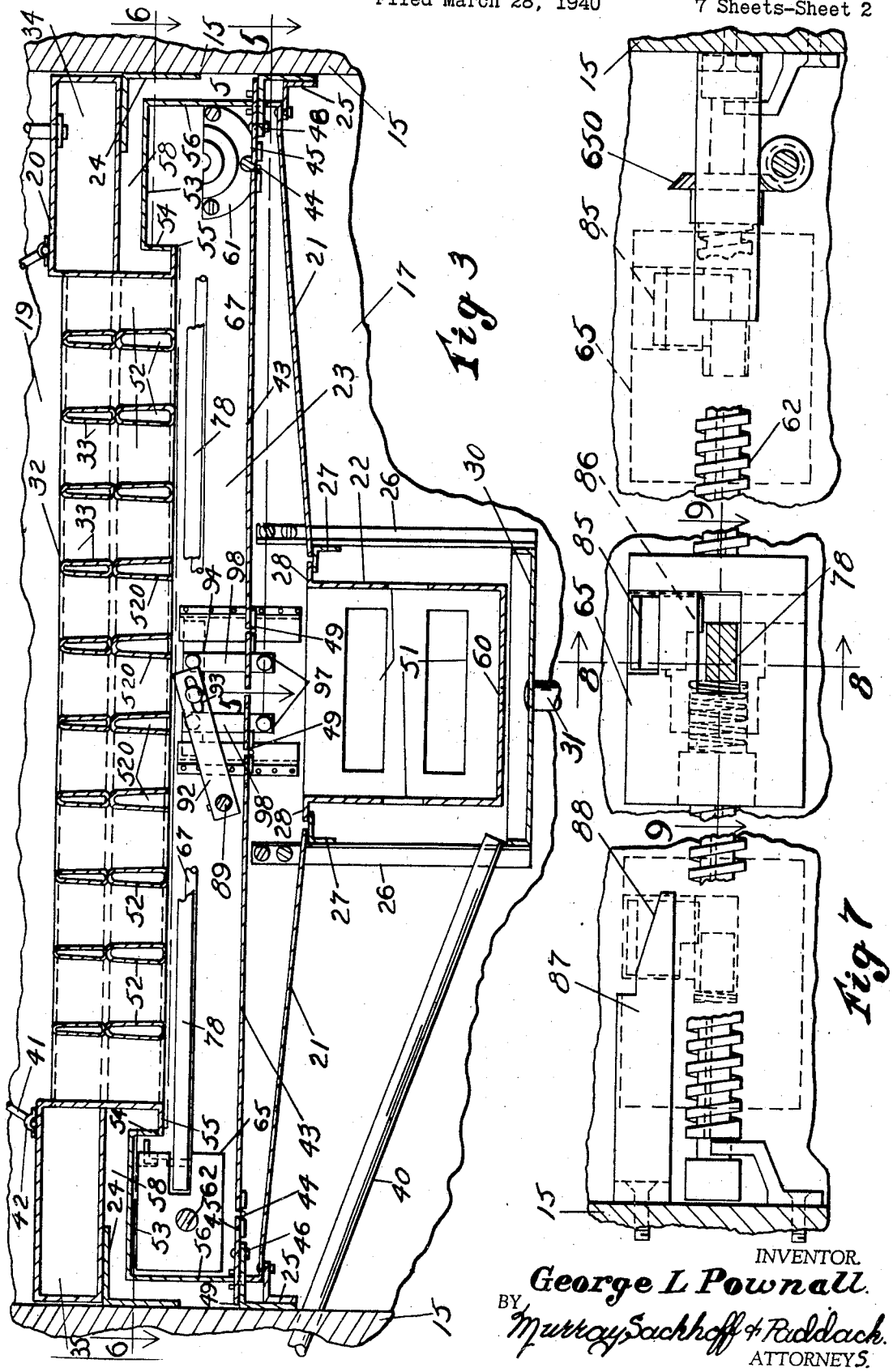
INVENTOR.
*George L Pownall*
BY *Murray Sachhoff & Riddack*.
ATTORNEYS.

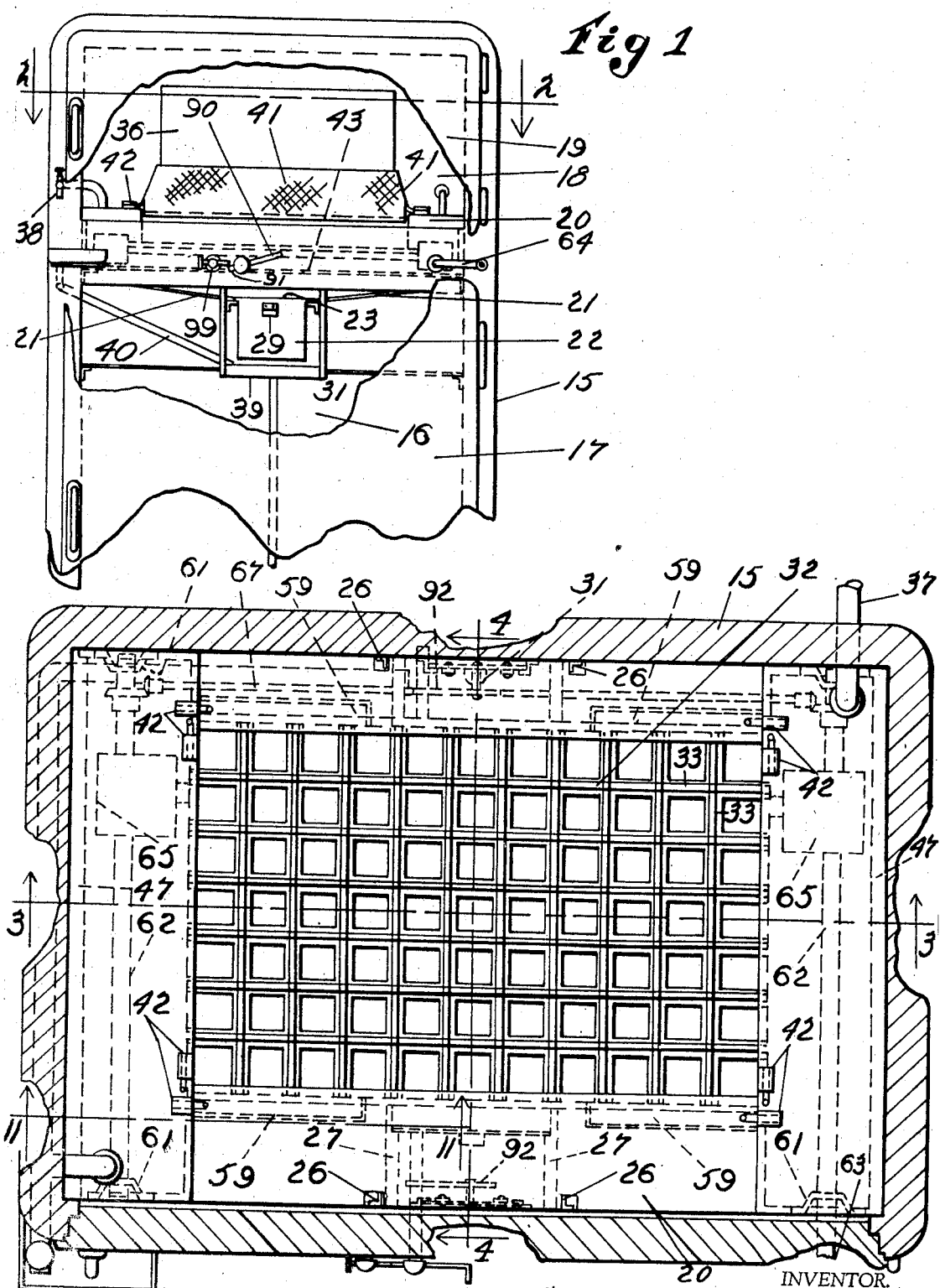

INVENTOR.
George L. Pownall.
BY Murray, Sackhoff & Paddack.
ATTORNEYS.

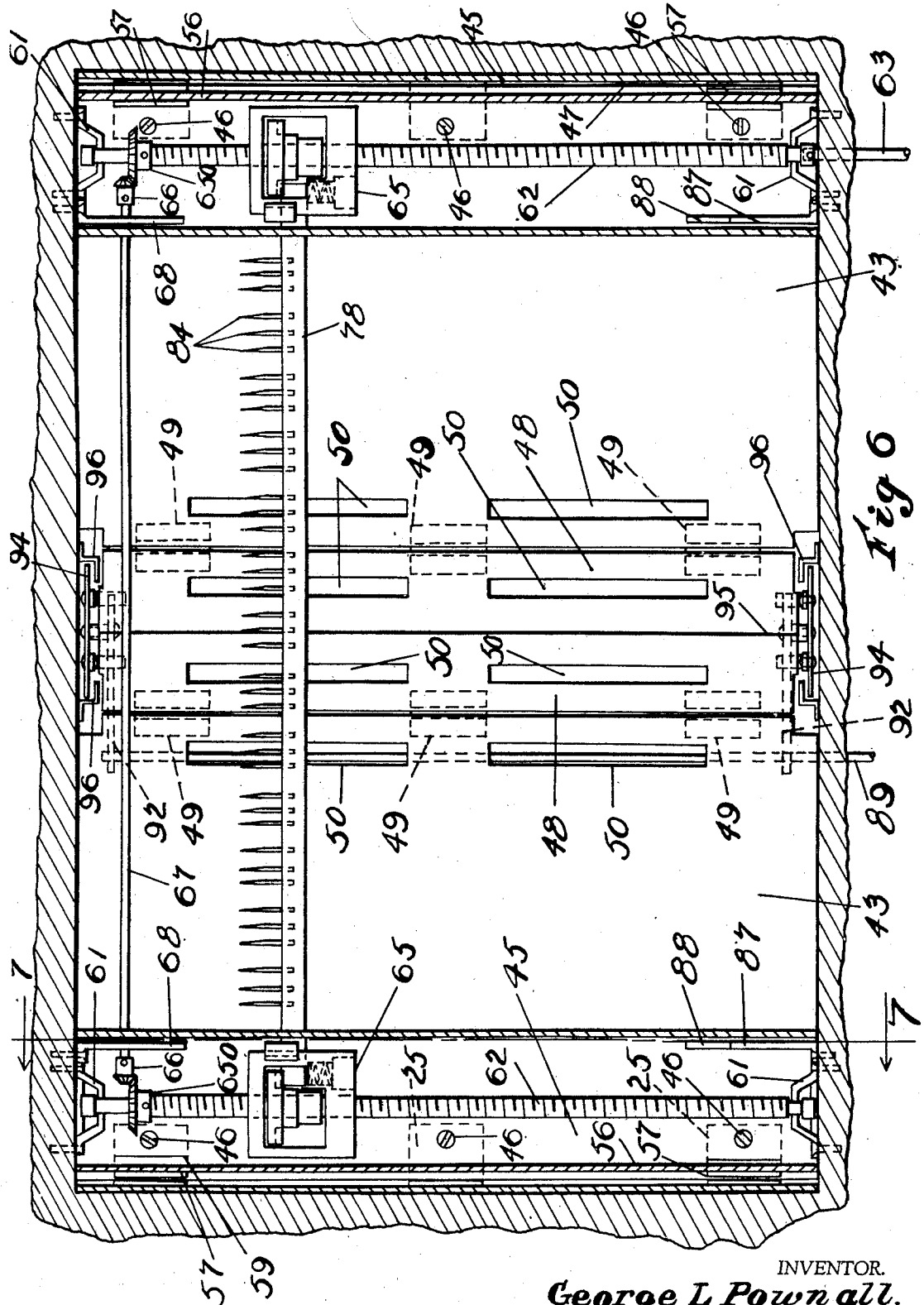

Jan. 11, 1944. G. L. POWNALL 2,339,109

ICE REFRIGERATION AND CUBE FORMING

Filed March 28, 1940 7 Sheets-Sheet 6

INVENTOR.
George L Pownall.
BY Murray Sachhoff & Paddack
ATTORNEYS

INVENTOR.
George L. Pownall.
BY Murray Sackhoff & Paddack
ATTORNEYS.

Patented Jan. 11, 1944

2,339,109

UNITED STATES PATENT OFFICE 2,339,109

ICE REFRIGERATION AND CUBE FORMING

George L. Pownall, Columbus, Ohio

Application March 28, 1940, Serial No. 326,447

27 Claims. (Cl. 62—89)

The present invention relates to improvements in ice refrigerators and has for an object the provision of novel means to maintain uniform and efficient chilling, cleansing, humidification and circulation of air for refrigerating purposes.

Another object of the invention is to provide an ice refrigerator wherein the entire duty of refrigeration is restricted to a predetermined bottom portion of a block of ice to maintain a refrigerating constant during the reduction of the total ice volume as the ice melts under varying demands on the refrigerator.

A further object of the invention is to provide an ice support member which forms the bottom portion of the block of ice into a multiplicity of spaced ice prisms which are integral with the remaining upper portion of said ice block and to thus provide a constant predetermined air chilling and conditioning area that is independent of the diminishing total volume of ice in the refrigerator.

Still another object of the invention is to provide a refrigerator as hereinbefore described which utilizes the extracted heat of stored articles alone or in conjunction with selectively operable auxiliary means to promote the propagation of the ice prisms and to further provide a releasable means to limit the length of the prisms thus developed.

Another object of the invention is to provide selectively operable cutting means for severing the ice prisms to supply ice cubes for the drinking glass.

Another object of the invention is to provide means cooperating with the contained block of ice in the refrigerator to selectively by-pass controlled amounts of circulating air around the normally isolated upper and top side portions of the block of ice.

These and other objects are attained by the means hereinafter described and exemplified in the accompanying drawings, in which:

Fig. 1 is a fragmental front elevational view of a refrigerator embodying the invention, parts being broken away to disclose the general interior and exterior arrangement.

Fig. 2 is an enlarged cross-sectional view taken on line 2—2 of Fig. 1.

Fig. 3 is a front enlarged cross-sectional view taken on line 3—3 of Fig. 2.

Fig. 6 is a view taken on line 6—6 of Fig. 3.

Fig. 7 is an enlarged sectional view taken on line 7—7 of Fig. 6 showing a feed screw of the device, partly broken away, and in full lines thereon a cutter bar carriage member, said member being also shown in dotted lines in the terminal positions at its limit of movement on the feed screw.

Figure 4:
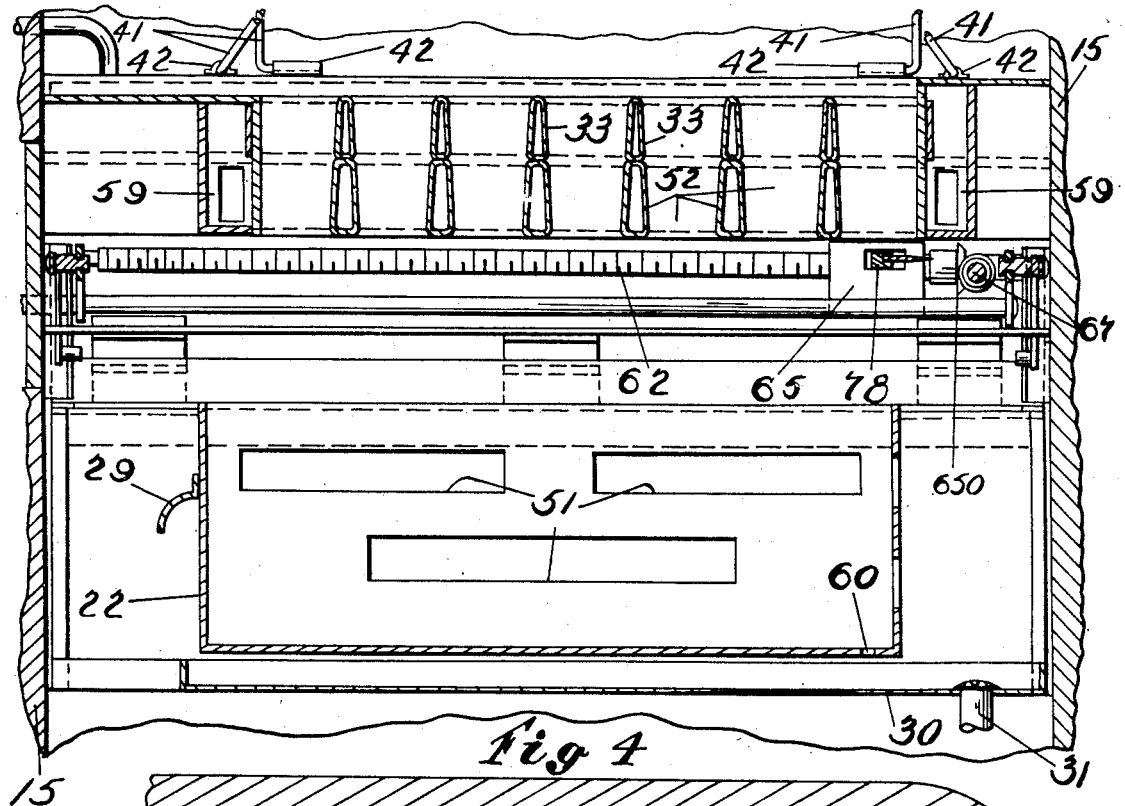
Fig. 4 is a vertical sectional view taken on line 4—4 of Fig. 2.
Figure 5:
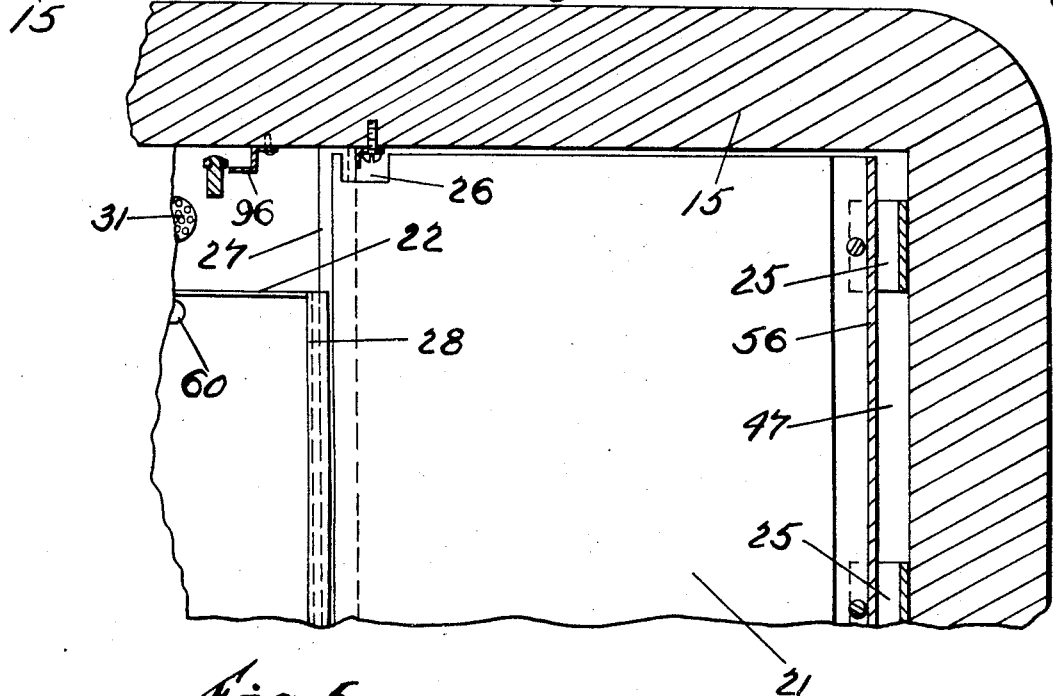
Fig. 5 is an enlarged cross-sectional view taken on line 5—5 of Fig. 3.

In the art of refrigeration for the preservation of food stuffs, the use of manufactured ice as a refrigerant is known to present certain items of superiority over mechanical refrigeration, among which items are the more important considerations of a desirable degree of humidity and an automatic natural cleansing of the air in the food compartment due to the washing of the warmer air containing the gases of food decomposition over the moist melting ice surface.

By the present invention these advantages are retained, controlled and augmented by the use of means which also provide certain advantages which have contributed to the popularity of mechanical refrigeration for domestic uses, but which have not heretofore been found in ice refrigerators.

In general, the present invention resides in providing, in a suitable ice refrigerator cabinet, an air chilling and conditioning compartment wherein the entire duty of refrigeration is afforded by a portion of a block of ice contained in an ice compartment and fed into the said air conditioning compartment as a multiplicity of spaced rows of spaced ice prisms. These prisms, while representing only a part of the entire volume of ice in the refrigerator, provide a plurality of narrow intersecting passages for the air to be chilled and the aggregate area of chilling surface on said prisms is greater than the total initial surface area of the solid block of ice introduced into the ice refrigerator in the first instance. This greater area is maintained as a constant during the melting away of the ice so that the efficiency of the refrigerator does not vary with the volume of ice present as in ordinary ice refrigerators. The length of the prisms of ice is kept uniform by a displaceable stop plate mechanism at the free ends, while the ice support melts into the ice block at the top or connecting ends of said prisms by conducting the exchanged heat of the substances to the solid part of the ice block in a lattice-like pattern of intersecting lines of contact conforming to the pattern of the passages between the ice prisms.

I have provided means to sever the ice prisms to obtain clear table ice portions or ice cubes for the drinking glass when desired, and I have further shown means to accelerate the formation of ice prisms by introducing auxiliary heat along the lines of contact between the ice support and the block of ice.

Air circulation between the ice compartment and the air conditioning compartment is almost completely precluded by the body of the block of ice and is made possible around the sides of the block of ice by adjustable baffle means when desired.

Air circulation between the food storage compartment and said air conditioning compartment is directed by suitable baffle means to flow through the passages between the ice prisms according to predetermined flow course so as to establish the desired temperature zones for various stored articles.

In practice, the invention may be advantageously embodied in refrigerators of side, top or bottom ice styles, with natural air flow or forced draft, and of various sizes and designs for general use or for specialized duty, such as cooling bottled beverages and supplying clear ice cubes.

Referring now to Fig. 1 of the drawings, a suitably insulated cabinet 15 has a food compartment 16 controlled by a door 17, and an ice compartment 18 desirably controlled by a separate door 19. A horizontal shelf structure 20 separates the ice compartment from the cabinet below and a pair of permanent baffles 21 supporting a depending slidable tray 22 serve to define an air conditioning and refrigerating chamber, which may be indicated generally as 23, in the top of the food compartment. The chamber 23 is thus bounded on its top by the shelf 20.

As can be best seen in Fig. 3, the structure of shelf 20 is supported on the interior side walls of cabinet 15 by means of brackets 24 while the baffle structure defining the bottom of the air conditioning chamber 23 is supported upon the double brackets 25 (see Fig. 3). Vertical angle members 26 are arranged in spaced pairs on the front and rear walls of the cabinet and have secured to them angle members 27 upon which rest the lower ends of baffles 21 and also the outwardly turned top flanges 28 of the tray 22. From an inspection of Figs. 1 and 3, it will be apparent that tray 22 is accessible when the door 17 of the food compartment is opened, the tray being drawn slidably forward by means of handle 29. Secured to the lower ends of angle members 26 is a drain pan 30 having a drain pipe 31.

In the center portion of shelf 20 is an ice support or grid, indicated generally as 32, formed of intersecting and intercommunicating hollow conduits 33 which communicate at the opposite ends with a tap water tank or compartment 34 and a cool water tank or compartment 35 disposed respectively at opposite sides of the refrigerator, said tanks or compartments being constructed as a part of shelf 20 in the embodiment shown in Figs. 3 and 4. Conduits 33 thus form hollow support bars upon which a block of ice 36 may rest in the ice compartment 18 and are adapted to be filled with water from tank 34 which is connected to a pressure tap water source by means of a tap water supply pipe 37. The extreme ends of the rearwardly extending conduits 33 are closed so that water from tank 34 is chilled as it finds its way through the myriad of intercommunicating conduits into chilled water tank 35 from which it may be drawn through an exteriorly disposed spigot 38. An exterior drain 39 beneath spigot 38 connects with the interiorly disposed tube 40 which empties into drain pan 30.

From the foregoing, it will be readily seen that the block of ice 36 resting upon the grid or ice support rack 32 will have the bottom portion thereof melted to form a plurality of rows of depending ice prisms which extend down into the air conditioning chamber 23. The sum total area of this multiplicity of ice prisms is thus rendered available for contact, directly and indirectly, with the warmer rising air in the food compartment in the manner hereinafter more fully described. As may be readily seen in Figs. 1 and 4, baffles 41 made of sheets of flexible material, such as rubber canvas, are hinged to the top of shelf 20 by hinge members 42, thus allowing the baffles 41, which overlap at adjacent ends, to be leaned against any or all vertical faces of the block of ice 36 and to thus adjustably control or to substantially preclude the circulation of air from the food compartment into the ice compartment proper. These baffles 41 are of particular value when the supporting face of ice supply block 36 is smaller than the area of the grid 32.

The water conduit grid constitutes one form of auxiliary or selective heat means to hasten the formation of ice prisms. The quantity of chilled water drawn from tap 38 will influence the rate of melting of the grooves in the bottom of the ice block so that the ice prisms, which thus extend progressively further through each of the apertures in the grid, elongate to the extent that the ends rest upon the top face of the hinged stop plates 43 and are melted away in the heat exchange operations. Stop plates 43 are hinged at 44 to strips 45 which are secured as by bolts 46 to the upper portion of brackets 25, the strips 45 being spaced substantially from the inner face of the refrigerator cabinet walls affording passages 47 immediately adjacent the side walls through which the air from the food compartment rises and enters the opposite ends of the air conditioning compartment 23.

The free edges of the stop plates 43 have plates 48 hingedly attached thereto by means of hinges 49 and these plates and also plates 45 have elongated apertures 50 therein which are normally disposed above the open top of ice tray 22 and afford the normal course for the descent of chilled air from the center of the air conditioning compartment into the ice tray which has a plurality of elongated slots 51 in the side walls and rear wall thereof.

Below and in registry with the conduits 33 of the upper or water grid is a corresponding series of air conduits 52 between which the ice prisms on the bottom of the melting block of ice pass as they extend downwardly towards the stop plate 43. As can be best seen in Figs. 2 and 3, inverted L-shaped baffle plates 53 each have a depending short leg 54 resting on a projecting ledge 55 of the air grid and also a long leg 56 resting edgewise on the fixed strips 45 of the stop plate assembly and retained against shifting by pairs of spaced parallel lugs 57. The laterally extending air conduits 52 communicate with the air passages 58 formed immediately below tanks 34 and 35 by the structure just described. At either side of the grid, at both the front and back thereof, are chambers 59 communicating with the passages 58 and with the open opposite ends of a number of the air conduits 52 which extend toward the rear wall of the refrigerator. The intermediate and remaining air conduits are indicated at 520 (see Fig. 3) and these are closed at opposite ends and are open on the bottom.

From the foregoing description, it will be appreciated that the conduits 33 and 52, comprising the duplex or two-in-one ice support grid, are chilled by the ice resting thereupon and extending therebetween. The warmer rising air from food compartment 16 will pass upwardly through the slots 47 into the passages 58 and thence through the ends of the conduits 52 towards the center thereof from whence the air descends through the open bottoms of the center group of air conduits 520, and then finds its way through the maze of passages afforded by the depending ice prisms in the air conditioning chamber 23 and from thence through the elongated slots 50 in the plates 43 and 48 of the stop plate assembly, thence downwardly to the open top of ice tray 22 and then through slots 51 in the tray. The heavy air, thus chilled and humidified and washed by contact with the multiplicity of ice surfaces, will then spill directly downwardly in the center of the food compartment 16. The possibility of stagnant or non-circulating air pockets in the food compartment is eliminated and the thermally circulating air moves at somewhat accelerated rate due to the clearly defined flow path maintained in the manner hereinbefore described. At this point it is to be again recalled that the baffles 41, when positioned as shown in Fig. 1, will substantially exclude thermal circulation through the ice chamber but will confine the thermal air flow to the paths just described. Under these circumstances the body of the block of ice above the grid is subjected to substantially no appreciable melting so that the air cooling surfaces in the grid and therebelow are not affected as to temperature by the presence or absence of a relatively large amount of ice in the ice chamber above the grid. This assures a substantially uniform source of air-chilling temperature in the air conditioning chamber 23. When some of the desired low temperature in the food compartment is lost by the opening of the food compartment door, the thermal circulation is accelerated almost immediately upon the closing of the door, thus causing the ice to melt faster for a time to quickly re-establish the desired temperature for the proper and scientific preservation of foods. It will be understood that the drip water from the melting ice passes through the slots 50 in plates 43 and 48 and into the ice tray 22 from which it passes through drainage hole 60 into drip pan 30.

At this point it is to be noted that in lieu of the duplex grid which uses both water and air as described, alternative forms of grid construction may be employed utilizing air alone or water alone circulating through a suitable grid of hollow members or a grid of solid metal bars may be used. Auxiliary heating means of various kinds may be used with the grids or omitted entirely.

Figure 10:
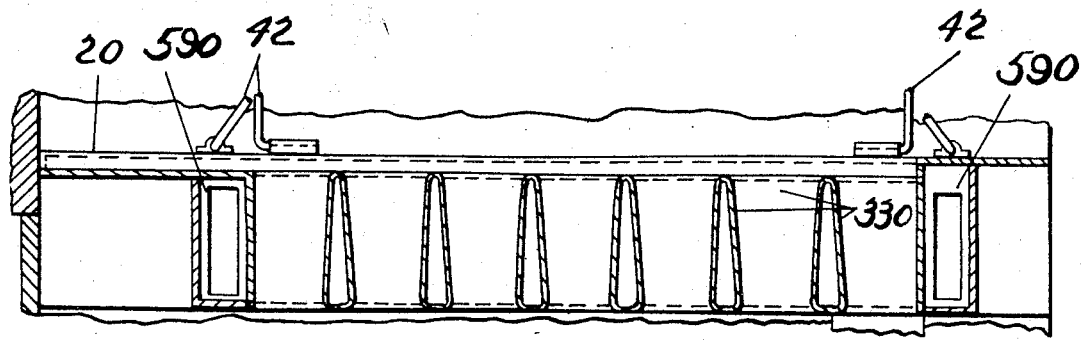
Fig. 10 is a cross-sectional view showing a modified form of ice supporting grid.
Figure 11:
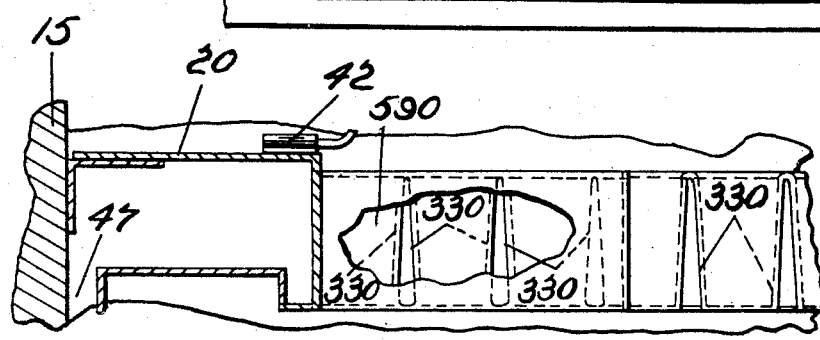
Fig. 11 is a fragmental sectional view taken on line 11—11 of Fig. 10, part being broken away.
Figures 14, 15:
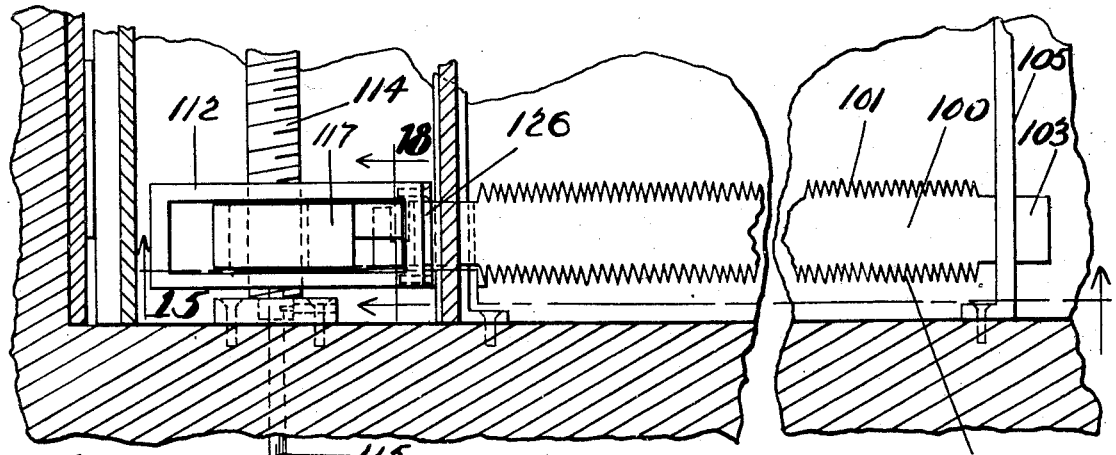
Fig. 14 is a horizontal sectional view of the refrigerator showing in plan a modified form of cutter mechanism, part being broken away.
Fig. 15 is a view taken on line 15—15 of Fig. 14.
Figures 16, 17, 18:
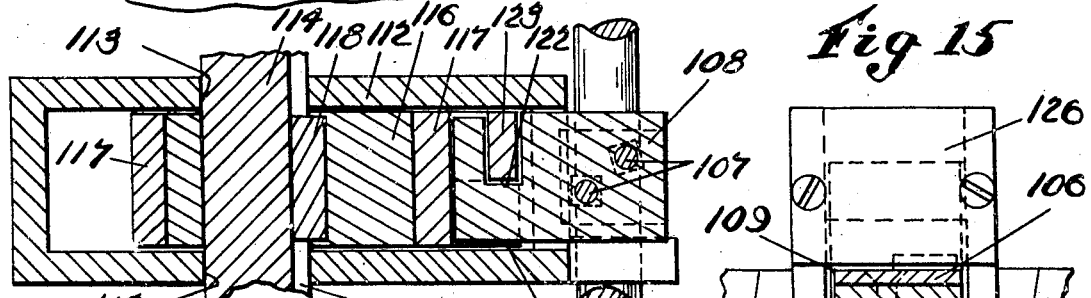
Fig. 16 is a sectional view taken on line 16—16 of Fig. 15.
Fig. 17 is a sectional view taken on line 17—17 of Fig. 15.
Fig. 18 is a sectional view taken on line 18—18 of Fig. 14.

In Figs. 10 and 11 there is shown an alternative form of grid and shelf structure which omits the water conduits and water tanks and which is desirably made of such size as to be interchangeable with the duplex or two-in-one grid shown in Fig. 4. The grid shown in Fig. 10 affords a more economical structure to be built into the ice refrigerator hereinbefore described, thus sacrificing the provision of a constant supply of chilled drinking water and doing away with the greater cost of the duplex type of grid and its water connections and fittings. The single grid or air grid is built into shelf 20 and has air conduits 330 which are equal in height to the combined water and air conduits in the previously described grid 32. The air chambers 590 correspond with the chambers 59 of Fig. 2 save that they are likewise of greater height. The single grid, as illustrated in Fig. 10, affords a greater chilled metal surface for contact with the air and provides a correspondingly increased cooling efficiency by omitting the amount of temperature exchange utilized for chilling the drinking water supply in the duplex grid.

Figure 12:
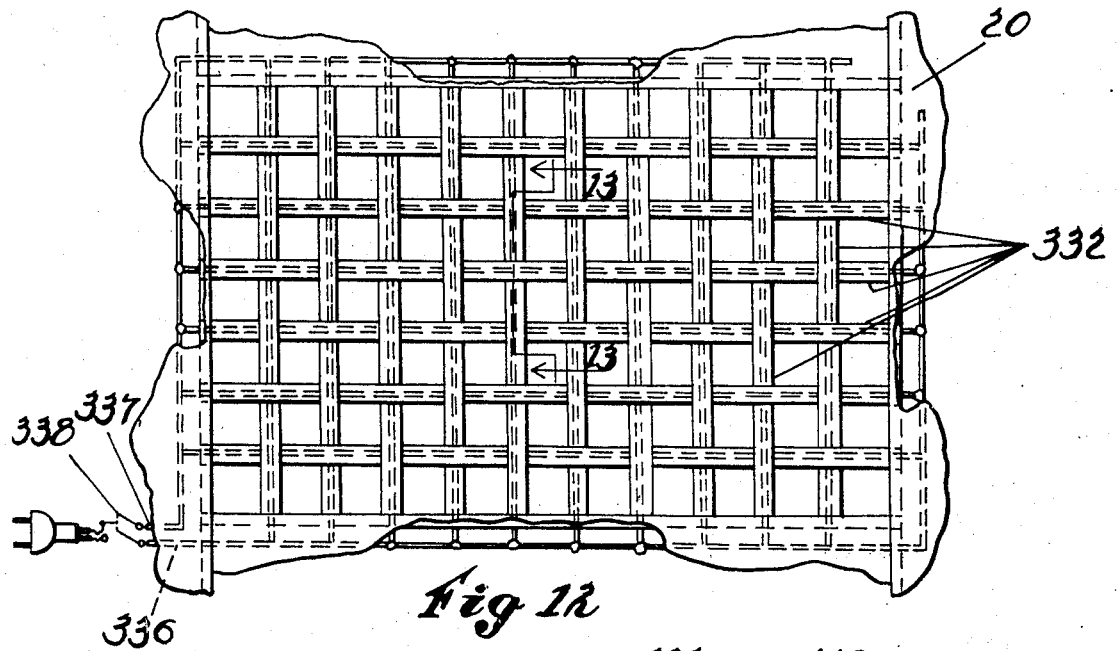
Fig. 12 is a top plan view of another modified form of ice supporting grid incorporating electric heating means to selectively accelerate the formation of ice prisms.
Figure 13:
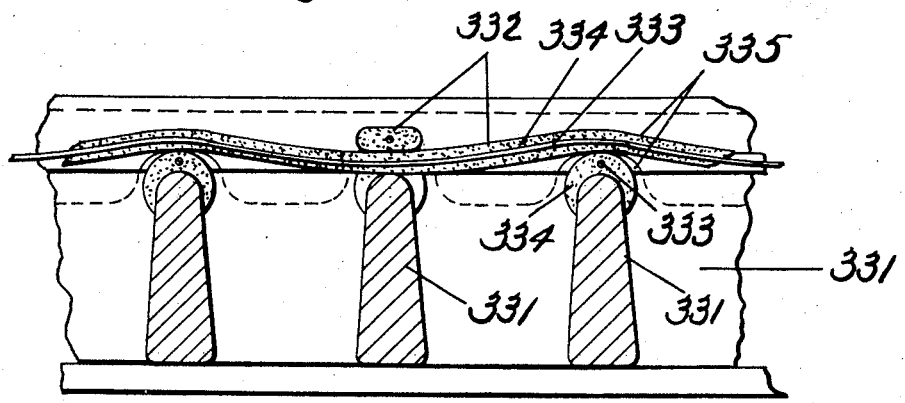
Fig. 13 is a sectional view taken on line 13—13 of Fig. 12.

In Figs. 12 and 13 a grid of solid metal members 331 is shown, the same being supported in the opening of the shelf 20 of the refrigerator as an ice support in lieu of the previously described single and duplex grids. As an inexpensive and simple auxiliary heating means, a network of electrical heating elements corresponding to the pattern of the grid may be secured to or mounted on the top edges of members 331. The electric heating members, illustrated generally at 332, are formed of strips of resistance-heating material 333 surrounded by electrical insulating material 334 which is externally metal clad as at 335. These elements are further grooved at and seated on the top edges of the grid members on opposite sides of each intersection of said grid members. The electric heating elements may be constructed in accordance wtih U. S. Patent 1,721,099, issued July 16, 1929. Such heating elements may be arranged in a woven mesh pattern and suitably secured at intervals to the grid members. The electric heating elements of whatsoever construction may be connected in parallel to a pair of electric feed wires 336 and 337 and controlled by a suitably located switch 338.

Thus it will be seen that the ice contacting the top of the grid will be melted relatively slowly by the heat conducted from the warmer air in the refrigerator to the metal of the grid and that ice prisms will be developed slowly. If, however, the ice prisms are cut off and removed, the auxiliary heating means may be employed to melt the ice rapidly along the lines of contact and thus speedily develop ice prisms to the maximum length.

Figure 8:
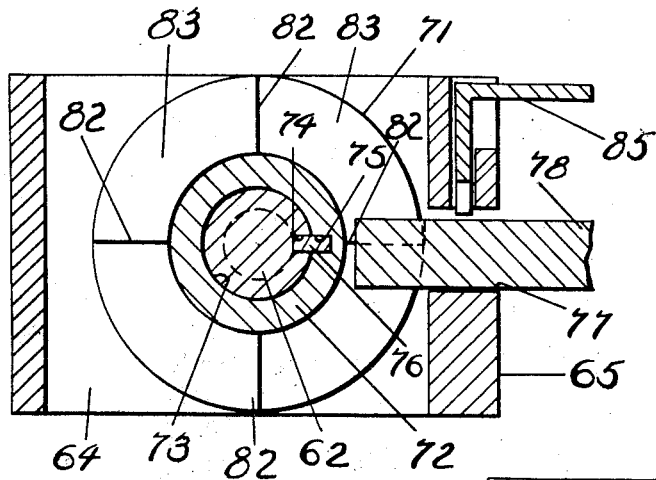
Fig. 8 is a view taken on line 8—8 of Fig. 7.
Figure 9:
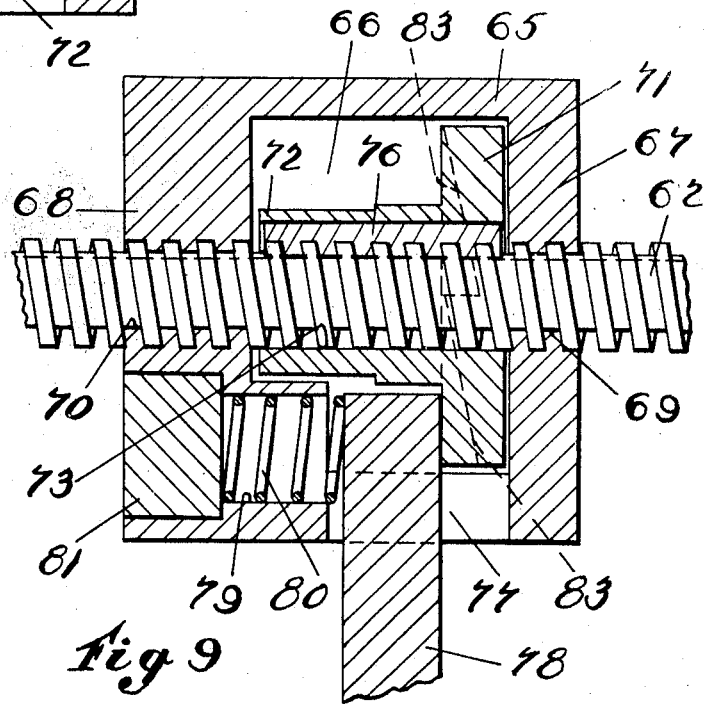
Fig. 9 is a view taken on line 9—9 of Fig. 7.

The mechanism for harvesting a desired quantity of table ice portions or ice cubes will now be described. It is to be understood that the mechanism may be substantially the same for any ice refrigerator of the invention regardless of the grid selected to be embodied therein. As shown in Fig. 6, on the front and rear interior walls of the cabinet beneath are aligned opposite pairs of bearing brackets 61 (see also the righthand side of Fig. 3) in which are rotatably supported the parallel feed screws 62, one of which has an extension 63 coupled thereto and journalled in the front wall of the refrigerator cabinet and upon which extension is secured a manually rotatable crank 64 which is disposed at the righthand side of the cabinet (see Fig. 1). The feed screws 62 each have a bevel pinion 650 at the rear end thereof meshing respectively with pinions 66 which are carried on opposite ends of shaft 67 which is journalled in brackets 68 secured to the rear wall of the cabinet. Manual rotation of the extension 63 imparts uniform rotation to the parallel feed screws 62. Each of the feed screws 62 has a carriage block 65 recessed as at 66 and having end walls 67 and 68 with threaded bores 69 and 70 respectively for threadedly receiving screw 62. A cam disk 71 has an extended hub 72 with a smooth bore 73 through which the screw 62 may pass. The cam 71 is disposed in the aperture 66 with the bore 73 concentric with the threaded bores 69 and 70. The screws 62 have longitudinal splines 74 and the hubs 72 have splines 75. A feather 76 serves to impart rotation of feed screw 62 to the cam 71—72. Threaded engagement of the screw in the end walls of the carriage serves to impart rotary movement to the cam and a feeding, non-rotary movement to the carriage block. The carriages have opposed lateral apertures 77 into which opposite ends of a transverse cutter bar 78 extend and in which said cutter bar may have limited reciprocation in the direction of the length of the carriage. Each carriage has a recess 79 housing a power spring 80 which is held under compression against the rear edge of cutter bar 78 by a removable plug 81. From the foregoing, it will be apparent that by reason of the cutter bar extending into the opposed carriage blocks 65 the uniform rotation of the feed screw will serve to uniformly advance said carriage blocks along the screw without turning them, while at the same time the cams 71 which are splined to the screws will rotate within the carriage blocks. As can be best seen in Fig. 8, the face of cam 71, against which the cutter bar is pressed by the power springs 80, has a series of abrupt shoulders 82 with intermediate inclined faces 83 between them. As the cams are rotated in unison, the opposite ends of the cutter bar 78 are pushed rearwardly by the inclined faces 83, thus compressing and loading the power springs 80 during one-fourth revolution of the screw and cam. The further rotation of the screws moves the abrupt shoulders from beneath the ends of the cutter bar thus allowing the cutter bar to be driven violently forward for a short distance under the impulse of the loaded springs 80. Cutter bar 78 carries a series of cutter points 84 which may be fixed thereto or formed integral with the cutter bar. The carriage blocks 65 are initially retracted to a position substantially against the front stop plates, hereinafter more fully described, and as said carriage blocks are fed forwardly by the manual rotation of the crank 64, the cutter bar is reciprocated within the carriage blocks four times per revolution while the carriage and cutter bar are slowly advanced substantially parallel to the bottom of the grid member, thus subjecting depending ice prisms to sharp rapid cutting impact, thus severing the prisms and providing ice cubes as required. When the cutter bar has completely traversed the bottom face of the grid, the cutter bar engages on the ends of member 68 (see Fig. 6) while the carriage blocks are advanced, thus retracting the cutter bar 78 in the carriage to a greater extent than it is normally moved by the cams 71. Under this condition a notched latch member 85 is free to drop and interpose the bottom end 86 between said cutter bar and the inner face of the recess in the carriage, thus withholding the cutter bar entirely from the cam during the return feed of the carriage blocks and the cutter bar. (See also the dotted line disclosure at the righthand side of Fig. 7.) When the carriage blocks and cutter bar have thus been retracted to the proximity of the front wall of the refrigerator, the front stop plate members 87 present the inclined faces 88 thereof beneath the latch 85 and gradually lift the latch in the position shown on the lefthand side of Fig. 7, whereupon the latch is released and the cutter bar is subjected to the influence of the cams and springs again.

Other cutter mechanism may be employed in lieu of that just described.

When ice cubes are to be made by the operation of the cutter means, the stop plates 43 and their hinged connected plates are dropped from the normal horizontal position to incline to the opposite longitudinal top edges of the ice tray 22, thus forming a longitudinal sloping trough into which the severed ice cubes drop and from which they slide into said ice tray.

The several hinged members of the stop plate assembly are controlled by a linkage system that holds them in a common horizontal plane. This linkage is releasable by an exteriorly operable holding lug, whereupon the plates drop into the said troughlike formation. An exteriorly operable crank handle serves to raise the plates to horizontal position when desired and the holding lug is engaged on the crank to retain the parts in elevated position.

This control means consists of a shaft 89 suitably journalled and extending from the front exterior of the cabinet to the inside just behind the rear edge of the stop plate members. A handle 90 with a projection 91 is mounted on the exterior end of the shaft. Inside the cabinet a pair of arms 92 are fixed to the shaft and each has an elongated slot 93 near its free end. A sliding crossbar 94 is loosely mounted on a pin 95 at each end, and these bars 94 are guided at opposite ends by Z-shaped guides 96 secured to the front and rear walls of the cabinet. The pins 95 are retained loosely in the slots 93 of arms 92. At the opposite ends of each of the plates 48, and on the lower face thereof, are perforate lugs 97 to each of which are loosely pivoted the vertical links 98. The top ends of links 98 are pivoted, two to each of the crossbars 94, so that as the shaft 92 is released to rotate under the weight of the linkage, the crossbars descend in a horizontal position and the links 98 descend with them and swing outwardly, thus allowing plates 43 to swing down on their hinges 44 until the edges of the plates rest on top of the ice tray 22, after which plates 48 swing down to a vertical position on hinges 49 inside and near the side walls of the ice tray.

When crank 64 is rotated, the cutter bar 78 delivers a rapid series of cutting impacts to the front transverse row of ice prisms which depend below the grid so that part or all of said prisms are severed and fall as ice cubes which slide down the sloping faces of the stop plates into the ice tray. The crank 64 may be turned one revolution to sever a sufficient number of ice cubes in some instances. If a very large number of ice cubes are needed, the cutter bar may be driven entirely to the rear limit and then returned. Where the duplex or two-in-one type of grid is used, the drawing of a large amount of drinking water from tap or spigot 38, as for use at the dining table, will hasten the development of additional depending ice prisms as the warmer tap water enters the water conduits. The ice tray 22 is of large capacity and a surplus or an advance supply of cubes may be stored therein to usefully contribute to the maintenance of the desirable temperature in the food compartment. The stop plate structure is raised from its inclined position by pulling the exteriorly disposed spring-pressed lug 99 away from the path of projection 91 on handle 90 and then lifting said handle and releasing said lug, thus leaving the exterior parts in the position shown in Fig. 1, while the stop plate assembly and linkage are held in the position best illustrated in Fig. 3. As previously indicated, the subsequent release of the stop plate and linkage requires only the momentary pulling out of spring-pressed lug 99.

Reference is now made to Figs. 14 to 18 inclusive, which show another cutter mechanism utilizing a double-edged saw for severing the ice prisms. The saw blade 100 has cutting teeth on the opposite edges 101 and 102 while the free end 103 is guided in a slot 104 in bar 105 disposed at one side of the air conditioning chamber. The opposite end 106 of the saw blade 100 is secured as by bolts 107 to a reciprocating block 108. Block 108 is mounted for reciprocation in the direction of the length of the attached saw blade 100 in a guide opening 109 in the front end wall 110 of a hollow rectangular housing 112. The side walls of housing 112 have aligned threaded bores 113 through which a rotatable screw shaft 114 extends. The shaft 114 is supported for rotation by suitable bearings supported on the front and rear interior walls of the refrigerator cabinet and crank-handle shaft 115 extends through the front cabinet wall and connects in driving relation with said screw shaft. Mounted on shaft 114 and disposed between the side walls of housing 112 is an eccentric cam 116 seated in a corresponding bore in a connector member 117. Cam 116 is retained between the walls of housing 112 and is splined to the shaft 114 by a sliding or feather key 118 extending into the cam and into keyway 119 in said screw shaft. The eccentric cam 116 thus imparts a back and forth and rising and lowering movement to the connector member 117 while the entire mechanism travels along the screw shaft as said shaft is rotated. Bodily turning of the housing is prevented by a fixed guide rod 120 extending through the bored guide boss 121 which is integral with or fixed to the front of housing 112. The block 108 has a vertical groove 122 extending about halfway across it for receiving complementary bar 123 which is formed by cutting a slot 125 of L-shaped cross-section in the connector member 117. This provides a sliding connection between said connector member and said block which results in a rectilinear reciprocation of block 108 in housing 112 as the eccentric cam rotates within the connector member. A front plate 126 is suitably secured to the front of housing 112 to restrict opening 109 to the proper size to insure smooth, non-chattering movement of the block.

The operation of the cutting mechanism just described will be readily understood to convert rotation of crank 115 into a combined reciprocation and feed movement of the saw. When the reciprocating saw has traveled to the limit in one direction and all of the depending ice prisms have been thus severed, row after row, the saw is left at rest until a subsequent group of prisms have developed by natural or accelerated melting of the ice block. Thereafter, when more ice cubes are wanted, the crank 115 is turned in a reverse direction to again reciprocate the saw and positively feed it in a reverse direction.

The operation of the refrigerator of the invention requires the opening of door 19 of the ice compartment only for the purpose of disposing a block of ice upon the grid and the adjustment of baffles 41 with relation to the sides of the ice block. Under ordinary operating conditions, the baffles contact the sides of the block of ice and only the bottom portion of the ice block is melted along the lines of contact with the grid or ice support member. The ice prisms resulting from the particular arrangement elongate and extend into the air conditioning chamber until they rest on stop plates 43—48. Air circulation proceeds from the food storage chamber 16 upwardly at the lateral sides of the cabinet through passages 47 and air chambers 58 from which the air flows centerward. When the grid is of the type having air conduits, the air passes through said conduits to the center part of the grid from whence it descends and passes between the ice prisms in the air conditioning chamber, through the slots in the stop plate structure and through the ice tray structure. If a solid metal grid is used instead of the air conduit type, the air flows centerward from air chambers 58 directly between the spaced ice prisms and then proceeds as just described.

In harvesting ice cubes, the stop plate structure is released to drop into the form of a guide trough emptying into the ice tray and the cutter mechanism is operated to sever the prisms which are guided into the said tray. The stop plate structure is then restored to horizontal position by the actuating linkage when the exterior lug 99 is retracted and handle 90 is operated.

The ice cubes may be removed immediately by opening the food storage compartment door 17 and pulling the tray 22 out from beneath the air conditioning chamber.

The use of any of the auxiliary heating means to accelerate the propagation of ice prisms will be readily understood.

Should the user of the refrigerator at any time desire to increase the humidity of the air, the baffles 41 may be tilted away from the sides of the ice block to a desired amount for controllably by-passing a part of the circulating air into the ice compartment.

What is claimed is:

1. In an ice refrigerator, means to retain a block of ice and progressively form spaced rows of spaced ice prisms integral therewith as the block of ice is melted in passing through said prism forming means, and a stop plate spaced from the said block retaining means and having a central area provided with apertures communicating with the spaces between certain of the spaces between said prisms for directing the discharge of air passing over the exposed faces of said prisms.

2. In an ice refrigerator, means to retain a block of ice and progressively form ice prisms integral therewith as the block of ice is melted, means for selectively and flexibly sealing against an inserted ice block adjacent the said retaining means, and means to sever said prisms substantially on the plane of the bottom of the ice block retaining means to provide ice cubes.

3. In an ice refrigerator, an ice support means providing spaced and intersecting lines of contact for a block of ice supported thereon whereby ice prisms are developed on the bottom of the ice block as the ice melts and settles under its own weight, and an air conditioning chamber including a stop plate spaced below the support means to limit the linear development of the prisms and close the bottoms of the spaces between the ice prisms in the air conditioning chamber.

4. In an ice refrigerator, an ice support means providing spaced and intersecting lines of contact for a block of ice supported thereon whereby ice prisms are developed on the bottom of the ice block as the ice melts in passing through the prism forming means and settles under its own weight, means for selectively and flexibly sealing against an inserted ice block adjacent the said retaining means, and a stop plate means spaced below the bottom of the support means for limiting the length of the ice prisms.

5. In an ice refrigerator, the combination of means to form ice prisms on a block of ice by the melting thereof in passing through the said means, an independent stop plate means to limit the length of said ice prisms and means for effecting movement of the stop plate means into and away from a predetermined limiting position.

6. In an ice refrigerator, the combination of means to form ice prisms on a block of ice, a stop plate means movable relative to the prism forming means and adapted to limit the length of said ice prisms, means for effecting movement of the stop plate means into and away from a predetermined limiting position, and means movable across the bottom of the prism forming means to sever the prisms to form ice cubes.

7. In an ice refrigerator, means to receive a block of ice and apply heat exchanged in the process of refrigeration in said refrigerator to the block of ice on a predetermined pattern whereby the block is melted away to form readily severable ice prisms and means operable from the exterior of the refrigerator for severing said prisms at substantially the bottom of the block receiving means.

8. In an ice refrigerator, means to receive a block of ice and progressively develop the same into ice prisms, means directing the circulation of air around the faces of said prisms after said prisms have passed through said prism forming means to the exclusion of the remainder of the ice block for effecting uniform cooling, cleansing and humidification surface for said air, and means whereby the prisms may be severed to provide an ice cube supply.

9. In an ice refrigerator, the combination with a cabinet of an ice compartment, a food compartment, a shelf in the cabinet separating the ice compartment from the remainder of the interior of the cabinet, said shelf having an enlarged opening therein, a grid formed of intersecting conduits extending across the opening and forming a support for a block of ice in said ice compartment, and means for directing circulating air from the food compartment into the opposite ends of said conduits and from the bottom of certain conduits into the top part of the food compartment.

10. In an ice refrigerator, an ice supporting grid comprising laterally and longitudinally extending intersecting and intercommunicating conduits, the longitudinally extending conduits being open at opposite ends, the center group of the laterally extending conduits being closed at the ends and open on the bottom, the end groups of said laterally extending groups being open at opposite ends, and means for directing thermally circulating air into the open ends of the aforesaid open ended conduits and discharging the same in chilled condition from the open bottoms of said central group of conduits.

11. In an ice refrigerator, the combination with a cabinet, of an ice supporting grid dividing the cabinet into an upper ice compartment and a lower food compartment and adapted, upon melting of a supported block of ice, to form ice prisms depending below said grid, baffle means in the top central part of the food compartment and forming between said baffle means and the bottom of said grid an air conditioning chamber into which the said prisms extend in spaced rows, said grid comprising hollow intersecting conduits adapted to receive warmer air from the sides of the food compartment and direct the same to the center of the grid, said grid conduits being open at the bottom in the center of the conduits for discharging the air into the air conditioning chamber.

12. In an ice refrigerator, the combination of an ice supporting grid of intersecting conduits, means directing thermal circulation of air through said conduits whereby the heat transfer chills said air and develops the bottom of the supported ice into depending ice prisms extending through the spaces in said grid, and means for progressively severing the depending prisms in a plane closely adjacent the bottom of the grid.

13. In an ice refrigerator, the combination of a grid of intersecting spaced members forming a support for a block of ice, means for directing a heating medium to said members for melting the pattern of the grid progressively upward into the bottom of such block of ice to develop depending ice prisms, a cutter bar, feed screws at opposite ends of the cutter bar, carriage blocks supporting the bar for independent oscillation in said blocks, said block engaging said screw for movement in unison to carry the bar across a plane beneath the grid, means comprising loading springs in the carriage blocks and rotary traveling cams on said screws for imparting rapid impact movements to said cutter bar as the carriage blocks are fed, and means to rotate said feed screws in unison.

14. In an ice refrigerator, a shelf unit for dividing a refrigerator into an upper ice compartment and a lower food compartment, said unit comprising an upper grid of hollow conduits, tank members at opposite sides of the grid and communicating with opposite ends of the conduits, a grid of hollow conduits below and in registry with said upper grid, the conduits of said lower grid being open at opposite ends below said tanks, and open at the bottom at the center of the grid, and baffle means permitting air intake at the ends of said conduits of the lower grids and discharge from the bottom center thereof.

15. In an ice refrigerator, the combination of means for supporting a block of ice and forming progressively deepening intersecting grooves from the bottom face of said block of ice toward the top and whereby spaced rows of spaced ice prisms are developed on the bottom of said block, means selectively and flexibly sealing about said block closely adjacent the prism carrying face thereof, whereby melting of the block is selectively confined to the prisms and prism carrying face of the block, and means operable in a plane to intersect the depending prisms below the bottom of the supporting means and movable progressively across said plane for severing substantially cubical ice portions from the rows of prisms.

16. In an ice refrigerator, an ice supporting grid whereby the bottom of a block of ice is developed into a plurality of depending ice prisms, a stop plate assembly comprising a plurality of hinged plates, linkage means for raising the plates into a common horizontal plane beneath the grid for limiting the development of said ice prisms, an ice tray supported below said stop plate assembly, exteriorly controlled means for releasably holding the linkage for retaining the stop plate assembly in said horizontal plane and actuatable to drop certain of said plates to inclined position overhanging said tray, and exteriorly operable means for progressively severing the depending ice prisms as table ice portions, said inclined plate members directing the ice portions into said tray.

17. In an ice refrigerator, a lattice-like grid for supporting a block of ice and developing the bottom of said block into a plurality of spaced rows of spaced ice prisms as the ice melts, a cutter bar for severing the ends of said prisms, baffle means and a cooperating depending apertured ice tray forming an air conditioning chamber around the depending ice prisms for discharging cleansed, humid and chilled air into the refrigerator from said ice tray.

18. In an ice refrigerator, the combination of means to form ice prisms on a block of ice, an independent stop plate means to limit the length of said ice prisms, and means for effecting movement of the stop plate means into and away from a predetermined limiting position with relation to the prism forming means.

19. In an ice refrigerator, the combination of means to form ice prisms on a block of ice by passage of said ice through the prism forming means, an independent stop plate structure to limit the length of said ice prisms, and means for effecting movement of said stop plate structure into and away from a predetermined limiting position in relation to the said prism forming means.

20. In a refrigerator the combination of an ice support means providing spaced and intersecting lines of contact for a block of ice supported thereon whereby ice prisms are developed on the bottom of the ice block, the support means dividing the refrigerator into an ice compartment above it and air-conditioning and storage compartments below it, means on said support means for selectively sealing about the surfaces of the ice block whereby air circulation is selectively controlled to flow over all surfaces of the ice block or over the depending prisms only, and means to sever the ice prisms substantially on the plane of the bottom of the ice block support means to provide ice cubes.

21. In combination means to form ice prisms on a block of ice by passage through the prism forming means, and hinged, retractable independent means to limit the length of the prisms thus formed.

22. In an ice refrigerator, the combination with a cabinet having an ice compartment, a storage compartment, of a shelf separating the ice compartment from the remaining interior of the cabinet, said shelf having an enlarged opening therein, a grid extending across the opening and adapted to support a block of ice along spaced and intersecting lines of contact and provide for air circulation on the bottom of the ice block to said storage compartment, and adjustable bypass means to selectively provide for air circulation between the ice compartment and the storage compartment.

23. In a refrigerator, means to retain a block of ice and progressively form spaced rows of spaced ice prisms on the block as it melts, stop plate means spaced from the retaining means and having a central area provided with apertures communicating with the spaces between certain spaces between said prims for directing the discharge of air passing over the exposed faces of said prims, and means to sever said prims substantially on the plane of the bottom of the said retaining means to provide ice prisms.

24. In a refrigerator comprising an ice compartment, means to retain a block of ice in flexibly sealed relation and to progressively form ice prisms integral with the block protruding from the ice compartment, and means to sever said prisms substantially along the plane of the bottom of said retaining means to provide ice cubes.

25. The combination of means to retain a block of ice and progressively form ice prisms integral therewith as the block passes therethrough, and retractable means independent of the prism forming means to limit the length of the prisms, said retractable means when in a lowered position serving as a chute for receiving prisms severed from the block.

26. In an ice cube forming means the combination of a grid comprising spaced and intersecting conduits to support a block of ice and to form ice prisms on the block as the block passes therethrough, headers communicating with said conduits, stop plate means independent of the grid, and means to sever the ice prisms substantially in the plane of the bottom of the grid to provide ice cubes.

27. In a refrigerator, the combination of a cabinet, means dividing the interior of the cabinet into three separate-purpose compartments, said dividing means defining a central air-conditioning chamber and an upper ice compartment, the ice compartment formed and adapted by the dividing means constituting its floor, to support a block of ice in selectively and flexibly sealed relation whereby ice prisms are formed on the bottom only of the ice block, and descend into the air-conditioning compartment for cleansing, chilling and humidifying air circulated from the lower compartment, and means in the air-conditioning chamber for severing and collecting depending ice prisms.

GEORGE L. POWNALL.